United States Patent
MacColl et al.

(10) Patent No.: US 6,434,854 B1
(45) Date of Patent: Aug. 20, 2002

(54) INTEGRATED MARKER AND TAPE MEASURE

(75) Inventors: Ian Coats MacColl, San Francisco; Donald MacDougall; Philip C. Whitaker, both of Arroyo Grande, all of CA (US)

(73) Assignee: Inventures Product Development, Inc., San Francisco, CA (US)

(*) Notice: Subject to any disclaimer, the term of this patent is extended or adjusted under 35 U.S.C. 154(b) by 0 days.

(21) Appl. No.: 09/633,306

(22) Filed: Aug. 7, 2000

(51) Int. Cl.⁷ ................................................ G01B 3/10
(52) U.S. Cl. .......................................... 33/668; 33/760
(58) Field of Search .......................... 33/668, 755, 759, 33/760, 761, 769

(56) References Cited

U.S. PATENT DOCUMENTS

| | | | |
|---|---|---|---|
| 2,816,369 A | * 12/1957 | Becker | 33/760 |
| 2,825,136 A | 3/1958 | May | 33/579 |
| 3,731,389 A | 5/1973 | King | 33/668 |
| 4,015,337 A | 4/1977 | Taylor | |
| 4,296,554 A | 10/1981 | Hammerstrom | |
| 4,439,927 A | 4/1984 | Elliott | |
| 4,542,589 A | 9/1985 | Yamamoto | 33/668 |
| 4,580,347 A | 4/1986 | McKnight | |
| 4,630,376 A | 12/1986 | Pentecost | |
| 4,667,412 A | 5/1987 | Carlson | |
| 4,729,171 A | 3/1988 | Samson | |
| 4,760,648 A | 8/1988 | Doak et al. | |
| 4,890,393 A | 1/1990 | St. Jean | |
| 4,914,830 A | 4/1990 | Legare | |
| 4,965,941 A | 10/1990 | Agostinacci | |
| 4,965,944 A | 10/1990 | Kuze et al. | |
| 5,349,760 A | 9/1994 | DeVito | |
| 5,386,643 A | 2/1995 | Corcoran | |
| 5,481,810 A | 1/1996 | Hastings et al. | |
| 5,787,599 A | 8/1998 | Clifton | |
| 5,809,662 A | 9/1998 | Skinner | |
| 5,816,939 A | 10/1998 | Ruffer | |
| 5,829,152 A | 11/1998 | Potter et al. | |
| 5,848,481 A | 12/1998 | Parsons et al. | |

* cited by examiner

Primary Examiner—Christopher W. Fulton
(74) Attorney, Agent, or Firm—Vierra Magen Marcus; Harmon & DeNiro LLP (57) ABSTRACT

An integrated marker and tape measure (20) which include a flexible tape and recoil assembly (24) and a marking mechanism (40). A desired tape dimension is aligned with a fixed indicator on the housing and a mark is made at the indicator on a surface being measured. The tool makes a linear mark by means of a simple button press which slidably moves the marking mechanism (40) across the surface. There is also included the option to have a braking mechanism, a locking mechanism, a level (120), a lens (118), a light (112), a marking template (122), and a means to add and subtract these optional features. The marking mechanism (40) can be exchanged with other marking mechanisms utilizing a variety of marking media.

42 Claims, 5 Drawing Sheets

INTEGRATED MARKER AND TAPE MEASURE

BACKGROUND OF THE INVENTION

1. Field of the Invention

The present invention generally relates to measuring devices, specifically an integrated marker and tape measure consisting of: a housing, a flexible tape with measuring increments, a coiling mechanism for the flexible tape, an extensible marking element for placing a mark on the surface being measured, and indicia located on the housing for indicating mark placement.

2. Description of the Related Art

Tape measures are generally used to either measure dimensions of an existing object or as an aid for marking at a specific distance from a reference point. While tape measures are adequate for measuring, it is more difficult for a user to mark a dimension accurately when using a separate marking instrument.

There is a variety of prior art which integrates a marking instrument or mechanism into a tape measure. The inventions tend to be more difficult to use as the marking method is not easy to use nor intuitive. When using a desirable erasable marking material like graphite, the prior art often requires the user to move the housing of the tape measure in order to make a mark. This movement can be difficult to perform accurately. Many systems modify the tape measure such that it is difficult to place in a pocket or employ in traditional measuring operations which diminishes its functionality as a tape measure.

A variety of inscriptive devices have been disclosed which combine a marker and tape measure. Agostinacci (U.S. Pat. No. 4,965,941; issued Oct. 30, 1990) discloses a double pronged marking system which uses an actuator member to deploy a mark on both sides of the tape. Several disadvantages of Agostinacci include placement of the actuator member in a position difficult for a user to operate during a variety of measuring and marking tasks, and a braking mechanism, which is not optimally functional. In addition, the invention makes two marks on the surface, which may not always be ideal for home applications. Pentecost (U.S. Pat. No. 4,630,376; issued Dec. 23, 1986) discloses an inscriptive device which is attached to the exterior of an existing tape measure. The device tends to be difficult to align with a desired measurement and difficult to operate in an ergonomically efficient manner. Ruffer (U.S. Pat. No. 5,815,939; issued Oct. 6, 1998) discloses a totally enclosed marking attachment for any tape measure which is engaged by lifting a finger pull and releasing to cause a striker to make an ink mark on the surface. The means of actuation, pulling up and releasing, may be difficult to perform in a variety of hand positions which is necessary for the operation of a tape measure; and the marking action is difficult to use with graphite.

Potter et al. (U.S. Pat. No. 5,829,152; issued Nov. 3, 1998) discloses an integrated system for measuring and marking on a surface by means of moving the housing towards the surface to mark a given point but again is difficult to use with an erasable marking material. Doak et al. (U.S. Pat. No. 4,760,648; issued Aug. 2, 1988) discloses a marking device that attaches to an existing tape measure and has a marking member which projects downward to contact the surface adjacent to a prescribed indicator. The marking device protrudes from the side of the housing and can interfere with location of the device in a storage pocket or may mar surfaces it comes in contact with. Taylor (U.S. Pat. No. 4,015,337; issued Apr. 5, 1977) discloses a combined tape measure and marking device that includes a tape measure assembly and a spring loaded arm which marks the surface pivotally on one side of the device. The invention also combines a mechanism such that when the mark is made, the tape is retracted into the housing automatically.

A variety of disclosures have been made regarding the inscription of a line perpendicular to the edge of a surface. Hastings et al. (U.S. Pat. No. 5,481,810) discloses a combination tape measure and straight edge apparatus, Clifton (U.S. Pat. No. 5,787,599; issued Aug. 4, 1998) discloses a layout and guide tool for marking a work surface, and Skinner (U.S. Pat. No. 5,809,662) discloses a tape measure assembly with a ridge that is disposed along an edge of its housing and is generally perpendicular to the housing's spooling axis. While all are capable of making a mark which is generally perpendicular to an edge, none integrate the feature into the housing itself, thus saving added complexity and additional manufactured part cost. Hammerstrom (U.S. Pat. No. 4,296,554; issued Oct. 27, 1981) discloses a belt clip which allows the insertion of a pencil for creating a visual mark on the surface. This requires the user to move the body of the tape measure to create a mark, an action which requires particular dexterity. Yamamoto (U.S. Pat. No. 4,542,589; issued Sep. 24, 1985) requires a mark to be made by means of rotating the case towards the extended tape, aligning the marker with the desired measurement, and scribing a mark. This also requires a particular dexterity to make an accurate mark. Carlson (U.S. Pat. No. 4,667,412; issued May 26, 1987) places a marking substance directly below an easy to read indicator yet requires frequent refills to maintain accuracy and a sideways motion to create a mark. Samson (U.S. Pat. No. 4,729,171; issued Mar. 8, 1988) incorporates an actuating element that allows for marking at both ends of the tape measure and this requires a side motion to use graphite lead to make a mark. Legare (U.S. Pat. No. 4,914,830; issued Apr. 10, 1990) discloses a tape measuring device with an integrated holder for a marking instrument like a pencil or pen. While the system is effective for making arcs, it is difficult to use for the marking of a simple linear dimension. Kuze et al. (U.S. Pat. No. 4,965,944; issued Oct. 30, 1990) is a measuring rule whose case allows for the marking of lines perpendicular and at an angle to an edge but does not allow for the marking without a secondary instrument. McKnight (U.S. Pat. No. 4,580,347; issued Apr. 8, 1986) discloses a tape measure with a number of features including an integrated light for viewing the tape.

The inventors believe the known prior art taken alone or in combination neither anticipate nor render obvious the present invention. These citations do not constitute an admission that such disclosures are relevant or material to the present claims. Rather, these citations relate only to the general field of the disclosure and are cited as constituting the closest art of which the inventor is aware.

SUMMARY OF THE INVENTION

Accordingly, several advantages of the present invention are:

(a) the ability to mark on a surface at a given distance from a reference point by pressing a button;

(b) the flexibility to use a variety of marking media including stamped ink, ball point pen, and graphite;

(c) the ability to use a marking media which requires friction with a writing surface to make a mark;

(d) the ability to create a mark in the shape of a line;

(e) a system which applies progressive braking to the tape assembly as a mark is being made;

(f) a system whereby the marking assembly is modular and can be changed depending on user preference and the material being marked;

(g) a system that can use a standard mechanical lead mechanism which has benefits of reliability and standardization of refills;

(h) a direct line of sight from above or from the side to align the mark and tape indicia with greater accuracy;

(i) a system which includes a modular door element which can be modified for additional features including a level, a light, a lens with a crosshair, and a magnifying lens;

(j) an attachment that acts as a square for drawing perpendicular and angled lines to an edge and other template dimensions;

(k) the ability to draw radii and parallel lines without a separate marking device;

(l) the ability to see tape indicia on either side of the door indicia, thus making it easier to accurately align a desired dimension (as opposed to aligning a dimension with the edge of a housing where the tape emerges);

(m) a footprint which is significantly similar to an existing tape measure in both size and durability.

These and other advantages are provided by the present invention, which in preferred embodiments relates to an integrated marker and tape measure which allows for measurement to a certain distance from a reference point and application of a mark at said distance.

Further advantages of the invention will become apparent from a consideration of the drawings and ensuing description.

BRIEF DESCRIPTION OF THE DRAWINGS

FIG. 5-A is a side and top view of the marking assembly at rest.

FIG. 5-B is a side and top view of the marking assembly when the button has been depressed such that the marking device is in contact with the surface to be marked.

FIG. 5-C is a side and top view of the marking assembly once the marking device has made a mark on the surface.

FIGS. 10-A and 10-B are perspective views of a marking assembly according to an alternative embodiment of the present invention.

FIGS. 12-A and 12-B are perspective views of the embodiment shown in FIGS. 10-A through 11 mounted within the tape measure and marking device according to the present invention.

DETAILED DESCRIPTION OF THE INVENTION

Integrated Tape Measure and Marking Assembly—FIGS. 1 to 4

A typical embodiment of the present invention is illustrated in FIG. 1, FIG. 2, FIG. 3, and FIG. 4. An integrated marker and tape measure 20 is shown to include a left housing 30, a right housing 32, a tape reel assembly 24, a door 34, a marking assembly 22, a locking assembly 26, and a belt clip 36, all held together with one or more screws 54 or other suitable assembly method. Left housing 30 and right housing 32 enclose the tape reel assembly 24, a button 44, and a button spring 46 when assembled.

Figure 3:
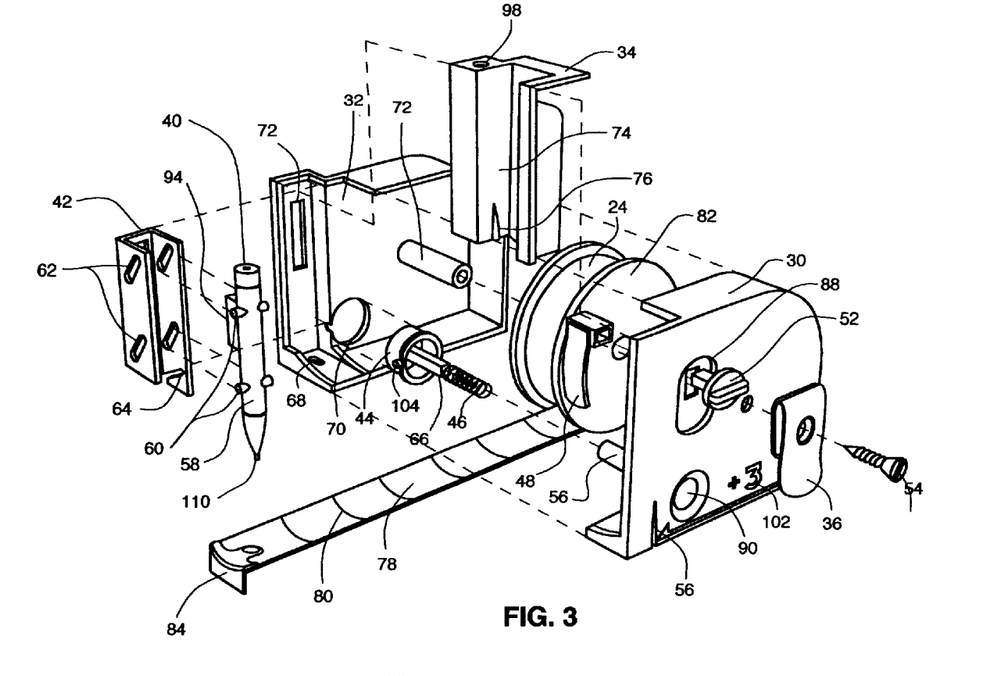
FIG. 3 is an exploded isometric view of the integrated marker and tape measure.

Referring to FIG. 3, tape reel assembly 24 is commercially available. A tape 78 is resiliently coiled on a tape reel 82 within a left housing 30 and a right housing 32. The tape is biased to retract around the tape reel when assembled. The tape includes multiple tape indicia 80 for measuring linear distances and a tape tab 84 is attached to the leading end of the tape to be used in positioning the leading end of the tape to the reference point, line, or plane from which a distance will be measured. The tape reel assembly is placed on a tape reel axle 72.

The button 44 is placed within a button seat 56 and held at a bias away from the button seat my means of a button spring 46. The button protrudes through a button hole 70 and is prevented from passing completely through by means of the button construction which is locally larger at its base than the button hole.

When connected, left housing 30 and right housing 32 create a cavity into which door 34 can be inserted and secured in place. An assembly of a yoke 42 and a marking mechanism 40 can be captured between right housing 32 and door 34 when secured in the cavity. Door 34 incorporates a door recess 74 and a pair of door indicia 76 at the bottom of said recess. The left housing and the right housing each have a mark indicator 100 which, when fully assembled with the door, are co-linear with both door indicia 76 and the center longitudinal axis of marking device 58, and parallel with tape indicia 80. A marking slot 68 is also in direct alignment with the door indicia, mark indicator, and the longitudinal axis of the marking device, which passes through said marking slot to mark a surface.

Figure 4:
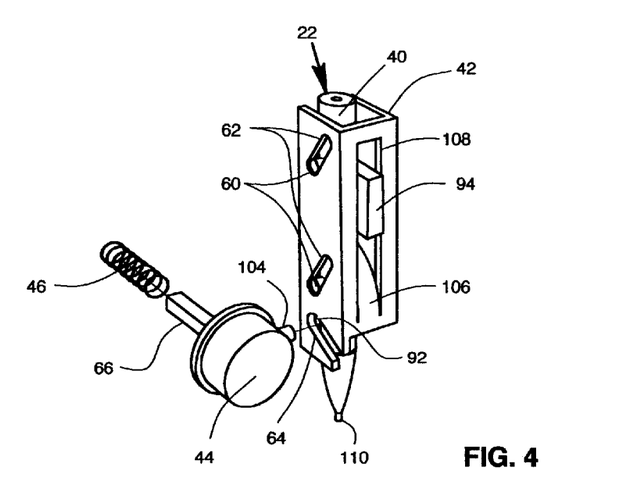
FIG. 4 is an isometric view of the marking assembly.

In the preferred embodiment shown in FIGS. 3 and 4, marking assembly 22 consists of a yoke 42, a marking mechanism 40, button 44, and button spring 46. Yoke 42 consists of multiple angled slots 62, a ramp 64, a yoke hole 108, and a yoke spring 106. Marking mechanism 40 consists of a marking device 58 and multiple axles 60. The preferred embodiment illustrates marking device 58 which is a mechanical pencil mechanism of well-known construction. The mechanical pencil has a graphite advance button 94 and a means for inserting said graphite into the device. Marking device 58 can be any material commonly used for making a mark on a surface including for example a writing instrument or a sharp object capable of scoring a surface. Marking mechanism 40 is assembled with yoke 42 such that axles 60 align with and are inserted into slots 62 and the axles are free to slide along the length of the slots. By sliding the axles within the slots, the marking mechanism moves both vertically and horizontally relative to the yoke. A yoke spring 106 can be integrated into the yoke and bears against a side of the marking mechanism such that the marking mechanism is positively biased towards the open longitudinal portion of the yoke. While the preferred embodiment illustrates an integrated yoke spring 106, this feature can be a separate part, for example a leaf spring or coil spring. The yoke further incorporates a ramp 64 which is angled.

In a preferred embodiment, button 44 incorporates a button shaft 66 which is of such a cross section to prevent rotation along the main axis and a button pin 104 which protrudes perpendicularly to the main axis of the button. Spring 46 is provided such that, when the button, spring, left housing, and right housing are assembled, the button protrudes through a button hole 70 and is biased away from the left housing.

In the preferred embodiment shown in FIG. 4, the graphite advance 94 protrudes from the yoke through a yoke hole 108. When marking assembly 22 is captured within the assembled marking tape measure, button pin 104 aligns within ramp 64. The diameter of the button pin is generally round and sized smaller than the width of ramp 64 such that it can move freely along the length of the ramp. When depressed, the button and the button pin move in a generally linear path (i.e., along the main axis of the button). When the button pin moves in a linear path along the length of the ramp, the button pin bears against the lower wall of the ramp to move the yoke generally downward along its vertical axis. The yoke does not move in any substantial horizontal motion as it is constrained from such movement by its placement between the door and the right housing. As the button moves along the course of its stroke, the button exerts friction onto tape reel 82 such that progressive braking is achieved.

Figure 2:
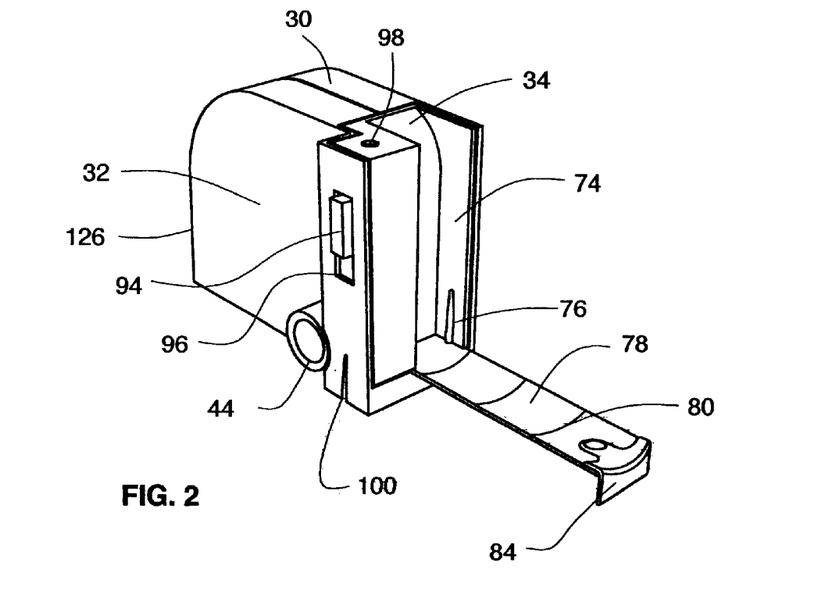
FIG. 2 is an isometric view of the integrated marker and tape measure from the right side.

Referring to FIG. 2, graphite advance 94 also protrudes from the right housing 32 through housing hole 96, which is sized to accommodate the vertical linear motion of the marking mechanism. The graphite advance extends beyond the surface of the right housing such that the stroke of the graphite advance can be swept.

A locking assembly 26 well-known in the art is incorporated to lock a tape 78 at any position of extension from the marking tape measure. A lock button 52 travels in a lock slot 88 when activated by the user.

Description—Alternative Embodiments—FIGS. 6 to 9

Figure 6:
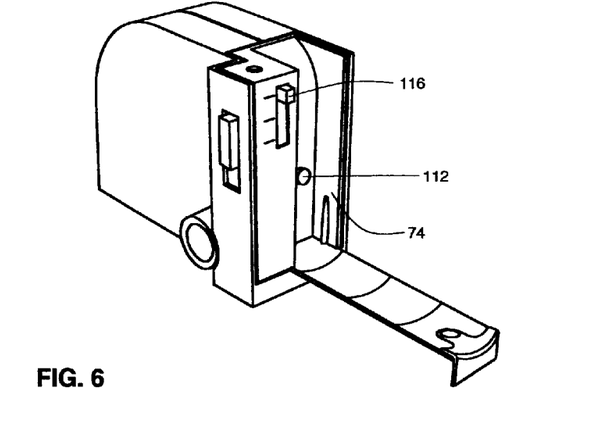
FIG. 6 is an isometric view of the integrated marker and tape measure with a light integrated into the door.

There are a variety of alternative embodiments for the integrated marker and tape measure. Door 34 can be modified to incorporate different features without making modifications to the left housing or right housing. Referring to FIG. 6, the door can integrate a light 112 and a power source (not shown) into the upper or lower part of door recess 74. The light, which shines on tape 78, can be activated in a variety of methods including an on-off switch (not illustrated), a pressure switch (not illustrated) which turns on as the marking button is depressed slightly and off when released, or a combination of the two via a user selected mode switch 116. The light can be a light emitting diode, a halogen bulb, or another standard lighting method well-known in the art.

Figure 7:
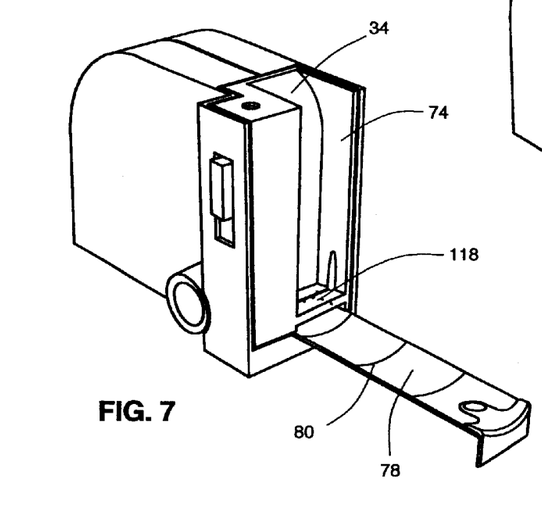
FIG. 7 is an isometric view of the integrated marker and tape measure with a lens integrated into the door.

Another modification to the door is shown in FIG. 7 where a lens 118 has been added to door recess 74. The lens may include a cross hair line which can be aligned with tape indicia 80 in order to provide more accurate readings. The lens may also include a magnifying lens such that the tape indicia appear larger to the user and easier to read. The lens may be a separate part attached to the door or integrated into the door itself.

Figure 8:
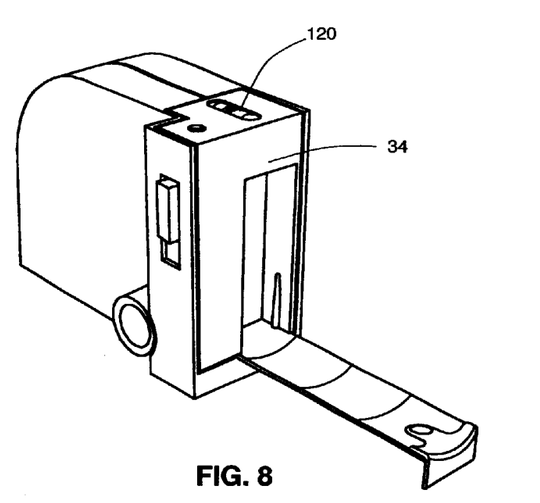
FIG. 8 is an isometric view of the integrated marker and tape measure with a level integrated into the door.

Yet another modification to door 34 is shown in FIG. 8 and illustrates the incorporation of a level 120 into the top surface. Alternatively, the level can be integrated into the main housing consisting of left housing 30 and right housing 32.

Figure 9:
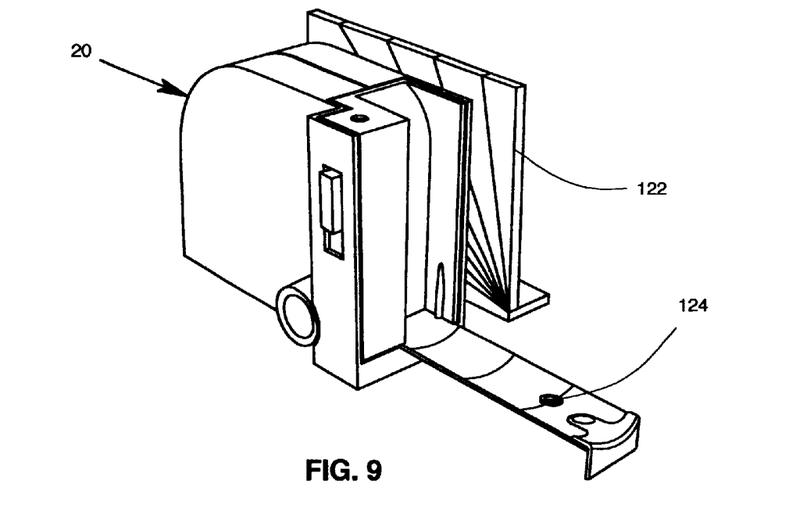
FIG. 9 is an isometric view of the integrated marker and tape measure with an accessory template.
Figure 10:
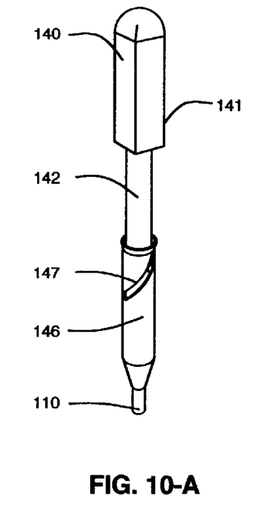
Figures 10, 11:
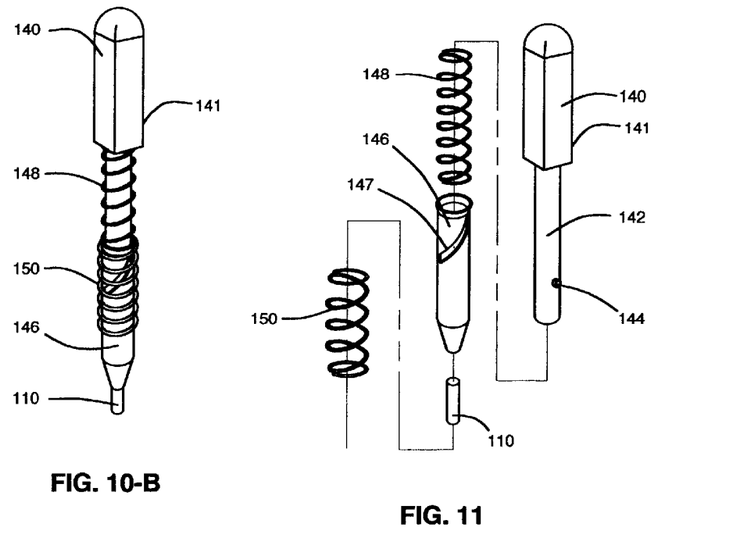
FIG. 11 is an exploded perspective view of the marking assembly shown in FIGS. 10-A and 10-B.
Figure 12:
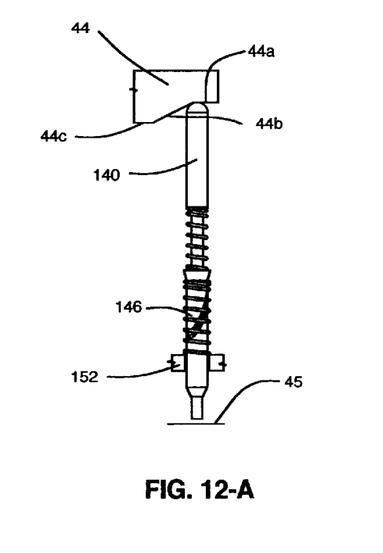

FIG. 9 shows a template 122 which can be used as an optional accessory attached to the marking tape measure to create additional functionality. The template can be attached to the marking tape measure and be used in conjunction with the marking feature. The template may include a square edge for scribing a perpendicular line to an edge, angled indicia from an origin for scribing angled lines relative to an edge, perforations to mark frequently used dimensions in construction or scribe parallel lines to an edge, or arced slots for scribing arcs.

The preferred embodiment of the left housing, the right housing, the yoke, the button, and the door may be, but are not limited to, injection molded plastic materials with characteristics which allow for operation in conjunction with the invention and metal materials. Plastic materials may include ABS and ABS and polycarbonate blends. The preferred embodiments for assembling the present invention include screws and ultrasonic welding for joining the left housing and the right housing. The marking device could be a pre-inked marking stamp, a sharp point which would scribe the surface, graphite, a ball point pen, a felt tip pen, or another material which causes a mark to be made when it comes in contact with the surface being measured and marked.

Operation—Marking Mechanism—FIGS. 1, 2, 4, 5A, 5B, 5C

Figure 1:
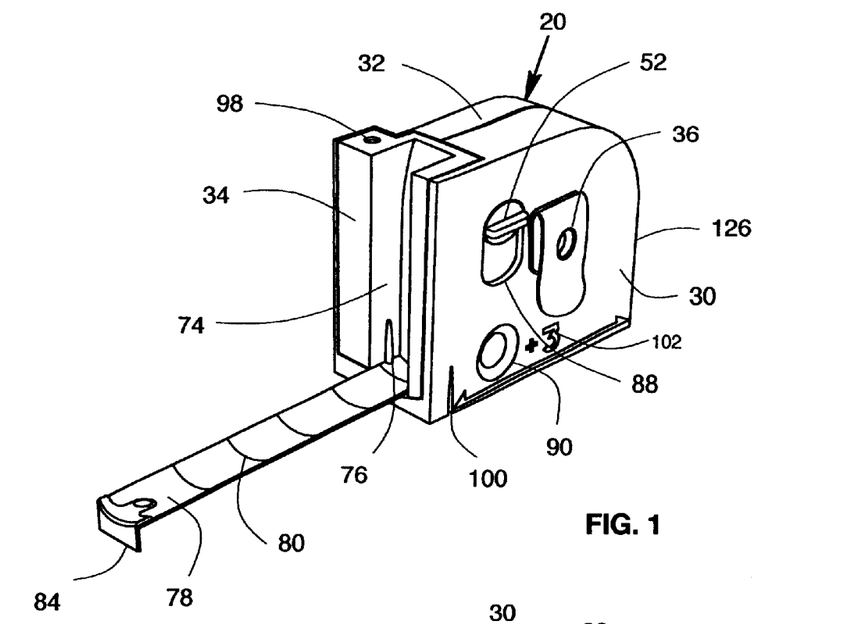
FIG. 1 is an isometric view of the integrated marker and tape measure from the left side.

The operation of the integrated marker and tape measure according to the present is as follows. A user extends tape 78 from the enclosure comprised of the left housing, the right housing, and the door. The user places a tape tab 84 over an edge or against a surface or otherwise aligned with a point from which they wish to measure and mark a relative distance. While one hand is used to steady the tape, the other hand manipulates the housing along a surface until door indicia 76 are aligned accurately with tape indicia 80 corresponding to said desired dimension. Depending on preference and measurement orientation of said surface being measured and marked, the user can sight said indicia alignment from above or from the front of door recess 74. Upon satisfactory alignment at the desired dimension, the user depresses button 44 which causes sequentially a braking motion to tape reel assembly 24 and a resulting mark is made on said surface. Upon removal of the marking tape measure, the user can see said mark placed on said surface in direct alignment with the door indicia.

Figure 5:
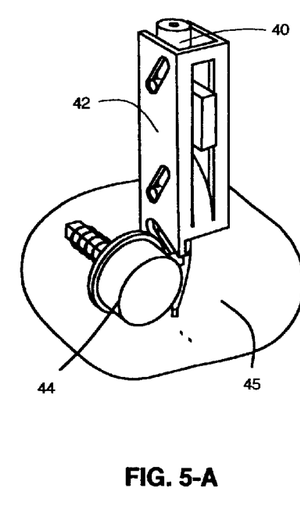

Depression of button 44 causes a mark to be made on a surface 45 by graphite 110 as follows. Referring to FIG. 5A, upon the initial depression of button 44 into the right housing 32, button pin 104 engages against the lower edge of angled ramp 64. As the yoke is horizontally constrained but vertically unconstrained, such engagement of the pin 104 against angled ramp 64 as the button 66 is depressed causes the yolk to move vertically downward within the device 20 toward the surface. The button pin 104 is prevented from rotation by the square button shaft 66 traveling within correspondingly shaped square button seat 56, or by other means commonly known in the art.

The yoke spring 106 and angled slots 62 together act on the marking mechanism 40 to bias the mechanism 40 to its most rearward position (i.e. away from hole 108 in FIG. 4) and its lowermost position within the yoke 42. In particular, the spring 106 exerts a force on the side of the mechanism 40 to bias the mechanism 40 rearward. The axles 60 exert this rearward force on the upper edges of angled slots 62, which in turn translate a portion of this force downward. Thus, prior to the marking mechanism touching the surface 45, the marking mechanism 40 is biased into a stationary position in the yoke 42 and moves with yoke 42 as the yoke moves downward.

Once the graphite 110 contacts the surface 45 as shown in FIG. 5B, relative movement between the yoke and the marking mechanism occurs because the marking mechanism is prevented from moving downward further by the surface, but the yoke continues to move downward upon continued depression of button 44. As the yoke moves downward with respect to the marking mechanism, the upper edges of angled slots 62 force the marking mechanism to move horizontally relative to the yoke, leaving a mark 47 on the surface 45 as it moves horizontally. It is significant that mark 47 is made while the integrated marker and tape measure 20 according to the present invention remains stationary on the surface 45.

The graphite 110 of marking mechanism 40 is pressed down on surface 45 while making mark 47 as a result of the yoke spring 106 and angled slots 62. As noted above, the yoke spring exerts a lateral force on the marking mechanism, a component of which is translated into a downward vertical force by the upper edges of the slots 62. The force of the graphite 110 against the surface 45, as well as the force required on button 44 to create mark 47, can be varied by varying the spring constant of the yoke spring and/or by varying the angle of slots 62. When the button 44 is fully depressed and mark 47 is fully formed, a detent 92 placed on the ramp can provide positive feedback to the user that the mark has been made.

When a force is no longer applied, a button spring 46 returns the button to its positive rest position against the right housing. As the button pin returns its path along the ramp, the yoke is moved upwards vertically until it returns to the rest position at the top of its travel. As the graphite no longer has a downward vertical force applied, the marking mechanism is returned via the yoke spring to its positive bias away from the central wall of the yoke. Thus, at the end of the return stroke of the button, all components are returned to their state of rest as shown in FIG. 5A. Those of skill in the art will appreciate that other finger-actuated mechanisms may be substituted for button 44 in alternative embodiments, such as for example a small lever. As used herein, "finger" may also include the thumb.

The left housing may incorporate a depression 90 used to help the user align and direct the pushing of the button. As an alternative embodiment, another positively sprung button is placed a the location of the depression to help secure the housing when a mark is made.

In the preferred embodiment, a graphite advance 94 is used to extend the graphite from marking mechanism 40 in discrete increments as needed by the user. This action is carried out generally when the marking assembly is in the rest position.

Operation—Inside Dimension—FIG. 2

In order to take an inside dimension between two vertical objects, for example two walls, a user places tape tab 84 against one surface and a rear wall 126 on the other surface and the tape indicia lined up with the door indicia are read. The dimension between the surfaces is arrived at by adding to said dimension an inside dimension indicator 102 clearly marked on the side of the housing. The user is instructed about this feature as the inside dimension indicator is an increment between mark indicator 100 and rear wall 126.

Operation—Changing Marking Mechanisms—FIG. 3

As previously indicated, the assembly of marking mechanism 40 and yoke 42 is secured in place between door 34 and right housing 32. Said assembly can be removed for refilling or changed to another more suitable marking media. Said assembly is accessed by removing the door and taking out the yoke and the marking device. To replace the assembly, it is aligned in the right housing and the door is secured in place. An alternative embodiment would connect the yoke and marking mechanism to the door such that it would be removed when the door is removed.

Operation—Light—FIG. 6

In an alternative embodiment, a light 112 is operated such that when button 44 is depressed slightly, contact is made between the light and power source (not shown). The light remains on while the button is depressed. Alternatively, the light is activated by means of a simple on-off switch or a mode switch 116 which would switch between the states of on, off, and activation only when the button is depressed. The power source and light is serviced or replaced by removing the door.

Operation—Lens—FIG. 7

Another alternative embodiment combines a transparent lens 118 combined with door 34. The lens is placed within door recess 74 in a plane substantially parallel to the tape, such that the user can sight through the lens to tape indicia 80 below. The lens may incorporate a graphic element to help define alignment between a desired measurement and the centerline of the marking mechanism. The graphic element can be one or more lines of various widths and lengths. Alternatively, the lens may incorporate a magnifying lens used to enlarge the tape indicia for easier reading. The lens can be stationary relative to the housing, or could be adjustable for focusing purposes.

Operation—Level—FIG. 8

In another variant, a level 120 integrated into the door is in a parallel plane to the bottom surface formed by the left housing and right housing. To perform a leveling operation, the tape is at least partially pulled out of said housing and said bottom surface is placed on the surface to be leveled. The user reads the level as is well-known in the art. Alternatively, the level is incorporated into any surface of the marking tape measure.

Operation—Template, Parallel Lines, and Arcs—FIG. 9

A template 122 is another alternative embodiment which may be attached as an accessory to the marking tape measure. The template is used in association with a mark made on a surface. The template enables a user to scribe a line which is: square to the edge of a surface in alignment with said mark, angled to a surface in alignment with said mark, an arc of various diameters, parallel to an edge of a surface, and various other manipulations generally carried out with thin walled templates. The template can also be integrated into either the left housing or the right housing or both. In addition, a pivot 124 can be used as a pivot point to scribe an arc. The user locks the tape at the corresponding diameter from the pivot, secures the pivot with a nail or other suitable point, depresses the button such that the marking device deploys, and scribes an arc. Similarly, a parallel line from an edge can be scribed by moving tape tab 84 along an edge while keeping the tape perpendicular and while holding down the button.

Alternative Tape Measure and Marking Assembly—FIGS. 10A to 12B

Up to this point, the invention has been described as including a marking assembly 22 which moves a marking end 110 across a surface to mark the surface with a line. In an alternative embodiment of the present invention shown in FIGS. 10A–12B, instead of translating downward into contact with the surface 45 and then translating along the surface, the marking assembly 22 may instead translate downward into contact with the surface, and then rotate concentrically along the axis of rotation. Rotation of the end 110 in contact with the surface 45 according to this embodiment causes the mark to be made on the surface. In this embodiment, marking assembly 22 includes an plunger 141 including an upper portion 140 having a substantially rounded top and a substantially square or rectangular cross-section below the rounded top. Plunger 141 further includes a lower portion 142 attached to the upper portion 140, which portion 142 includes a pin 144 along its length. The marking assembly according to this embodiment further includes a yoke 146 having a central opening which fits around lower portion 142 so that pin 144 rides within a slot 147 formed diagonally and partially around circumference of yoke 146. Graphite 110, or another marking element, is in turn mounted to a bottom portion of the yoke 146.

A spring 148 is also provided around lower portion 142 of plunger 141, which spring has an upper end abutting against upper portion 140 and a lower end abutting against an upper lip of yoke 146 (spring 148 is omitted from FIG. 10A for clarity). Spring 148 biases the yoke 146 downward with respect to plunger 141 so that, when the end 10 is not in contact with a surface 45 to be marked, the pin 144 resides in an uppermost portion of slot 170.

Button 44 in accordance with the embodiment shown in FIGS. 10A–12B includes an upper flat 44a, a sloped surface 44b, and a lower flat 44c. Prior to button 44 being depressed to actuate the plunger 141, the rounded top of upper portion 140 lies in contact with upper flat 44a. When button 44 is pushed inward into the right housing as described above, sloped surface 44b engages the rounded top and forces the plunger 141 downward. The upper portion 140 of plunger 141 rides within a restraining device (not shown) having a shape corresponding to upper portion 140 to thereby prevent rotation of the plunger 141 as it moves downward.

Biased by spring 148, the yoke 146 remains stationary with respect to plunger 141 until the end 110 comes in contact with surface 45 as shown in FIG. 12B. With the yoke 146 now prevented from translating further, and the plunger 141 continuing to move downward as it rides along sloped surface 44b, relative motion between the yoke and plunger occurs, and pin 144 rides downward in slot 147. As pin 144 is prevented from rotating, this downward motion of pin 144 in slot 147 causes yoke 146 to rotate, and in turn the end 110 to rotate in contact with surface 45. This rotation of end 110 against surface 45 leaves a desired mark on surface 45.

This embodiment further includes a spring 150 (omitted from FIG. 10A for clarity) having a top end abutting against the upper lip of yoke 146 and a bottom end against stop 152. Stop 152 includes a central opening through which yoke 146 translates. Spring 150 biases the yoke 146 and plunger 141 (via spring 148) upward. Thus, when button 44 is released, the yoke 146 and plunger 141 move upward as button 44 returns to its unbiased position.

Accordingly, the reader will see that the integrated marker and tape measure of the invention can be used to easily make a mark on a surface from a pre-designated point or edge to a desired dimension. The means for actuation of the marking mechanism are placed in an ergonomically desirable location suitable for both right and left handed users. The direction of actuation, normal to the sidewall of the housing, provides for a more accurate result as the body of the invention does not move as the button is being depressed. Similarly, integration of a braking mechanism with the actuation of the marking assembly provides for a more accurate mark as the spool cannot move as the mark is being produced.

The marking mechanism can mechanically make a line on a surface with a movement independent of the housing. In other words, the user need not move the housing to create a mark on a surface; the line is created from mechanical means when an actuator is depressed by the user. In addition, there are a variety of ways to sight and align the tape indicia with the indicia showing the location of the mark. The ability both to look down onto the indicia from the top and to see tape indicia on both sides of the door indicia provide a more controllable method for the user.

The present invention can make a mark with a variety of marking media and can be changed easily from one to another. These can include stamped ink, ball point pen, and standard graphite, some of which require movement and friction to create a visible mark. The motion of the marking mechanism also makes it possible to create a line of varying length. In addition, there exists the ability to swap in different marking media for different applications.

With a housing including the left and right housing described above, the door can be modified to alter the functionality of a particular product. While in the preferred embodiment the door acts as an alignment device, it can be modified to incorporate a light, a level, a magnifying lens, or a sight with a crosshair, among other things. The door could be constructed of a clear molded material and glow to more easily see the tape indicia. The door and the placement of the door indicia also make it easier for a user to sight a desired dimension as there has been provided space between the inner wall of the door recess and the door indicia. This space makes it easier to target a dimension accurately as opposed to reading the dimension as it aligns with the opening as the tape departs the housing. The space also makes it easier to take an interior dimension as the tape indicia are easier to read when fully exposed.

The marking tape measure can extend its functionality by the addition of accessories like the template which allows the user to perform common measuring tasks like scribing perpendicular lines, angled lines, arcs, and commonly used distances. The invention can also be anchored to the pivot and an arc scribed using the marking mechanism. Similarly, a parallel line can be scribed by moving the tape perpendicular along an edge with the marking mechanism deployed.

Those of skill in the art will further appreciate that in a further embodiment of the present invention (not shown), yoke 146 and pin 144 maybe omitted, and the marking end 110 may be affixed directly to lower portion 142 of the plunger so that upon depression of button 44, there is no rotation, but a mark is made solely as a result of contact between marking end 110 and the surface 45.

Although the description above contains many specificities, these should not be construed as limiting the scope of the invention but as merely providing illustrations of some of the presently preferred embodiments of this invention. For example, the housing can have other shapes, the button can be an integrated part, the marking mechanism can be a sharp object or other suitable marking device, the indication of mark placement could be digitally controlled, the materials for manufacture may be different, etc.

While certain exemplary embodiments have been described above and shown in the accompanying drawings, it is to be understood that such embodiments are merely illustrative of and are not restrictive to the broad invention, and that this invention not be limited to the specific constructions and arrangements shown and described, since various other modifications may occur to those ordinarily skilled in the art. Thus, the scope of the invention should be determined by the appended claims and their legal equivalents, rather than by the examples given.

We claim:

1. A tape measure capable of making a mark on a surface, comprising:

a housing;

a flexible tape capable of substantially retracting into said housing and capable of substantially extending from said housing;

a marking mechanism mounted at least substantially within said housing, said marking mechanism including an end capable of making the mark on the surface; and an actuator capable of moving said end across the surface to make the mark on the surface, said actuator capable of moving said end while said housing remains stationary relative to the surface.

2. A tape measure as recited in claim 1, wherein said actuator comprises:

a finger-actuated mechanism capable of moving between a first position and a second position; and a yoke acted on by said finger-actuated mechanism and for supporting said marking mechanism, said yoke moving said marking mechanism vertically until said end contacts the surface, and horizontally across the surface to make the mark after said end contacts the surface, as said finger actuated mechanism moves between said first and second positions.

3. The tape measure of claim 1, wherein said actuator creates a graduated braking force on said flexible tape when said actuator moves said end across said surface.

4. The tape measure of claim 1, wherein said end is graphite.

5. The tape measure of claim 1, wherein said end is a sharp object.

6. The tape measure of claim 1, wherein said end rotates with respect to said surface.

7. The tape measure of claim 1, wherein said housing contains a level.

8. The tape measure of claim 1, wherein said housing contains a lens which includes a graphic indication.

9. The tape measure of claim 1, wherein said housing contains a lens which includes a means of magnification for alignment and legibility of said incremental indicia.

10. The tape measure of claim 1, wherein said housing has a detachable attachment used with a separate marking element for scribing a perpendicular line from an edge, an angled line relative to an edge, and/or a parallel line to an edge.

11. The tape measure of claim 1, wherein said flexible tape incorporates a pivot around which an arc-shaped indicium is made when said marking element is in said extended position.

12. The tape measure of claim 1, wherein said marking element is residually biased away from said surface.

13. The tape measure of claim 1, wherein said housing includes a means for locking said flexible tape at a preselected position with respect to said housing.

14. A measuring and marking implement comprising:

a housing defining a front wall having a lower portion formed with a slot therein and defining a bottom wall;

a flexible tape transversely wound inside said housing, said tape having incremental indicia thereon for measuring distances, and one end protruding outside said housing through said slot;

a marking element mounted to said housing adjacent to said flexible tape, generally perpendicular to said bottom wall, axially co-planar with said housing indicia and said incremental indicia when aligned, said marking element including:

an elongate member with a point for forming a mark on a surface in contact with said bottom wall, an elongated holder surrounding and encasing said member, a means of actuating said elongate member and said holder between a retracted position, wherein said point is positioned above the outer surface of said bottom wall, and an extended position, wherein said point extends below said outer surface, a means of slidably moving said point across said surface independent of the movement of said housing such that an indicium is created on said surface.

15. A tape measure as in claim 14, further comprising one or more housing indicia located on said housing which can be aligned with said incremental indicia when said tape is pulled out of said housing.

16. The measuring and marking implement of claim 14, wherein said means of actuating creates a graduated braking force on said flexible tape when said marking element moves from said retracted position to said extended position.

17. The measuring and marking implement of claim 14, wherein said means of actuating urges both said movement from said retracted position to said extended position and said means of slidably moving said marking element.

18. The measuring and marking implement of claim 14, wherein said graduated braking force acts on said flexible tape when said marking element moves from said retracted position to said extended position.

19. The measuring and marking implement of claim 14, wherein said elongate member is graphite.

20. The measuring and marking implement of claim 14, wherein said housing contains a level.

21. The measuring and marking implement of claim 14, wherein said housing contains a lens which includes a graphic indication.

22. The measuring and marking implement of claim 14, wherein said housing contains a lens which includes a means of magnification for alignment and legibility of said incremental indicia.

23. The measuring and marking implement of claim 14, wherein said housing has a detachable attachment used with a separate marking element for scribing a perpendicular line from an edge, an angled line relative to an edge, and/or a parallel line to an edge.

24. The measuring and marking implement of claim 14, wherein said flexible tape incorporates a pivot around which an arc-shaped indicium is made when said marking element is in said extended position.

25. The measuring and marking implement of claim 14, wherein said marking element is located within said housing and is accessed by means of a door in said housing.

26. The measuring and marking implement of claim 14, wherein said marking element is residually biased to said retracted position.

27. The measuring and marking implement of claim 14, wherein said housing includes a means for locking said flexible tape at a preselected position with respect to said housing.

28. The measuring and marking implement of claim 14, wherein said elongated member and said elongated holder are the same part.

29. A measuring and marking implement comprising:

a housing defining a front wall having a lower portion formed with a slot therein and defining a bottom wall;

a flexible tape transversely wound inside said housing, said tape having incremental indicia thereon for measuring distances, and one end protruding outside said housing through said slot;

one or more housing indicia located on said housing which can be aligned with said incremental indicia when said tape is pulled out of said housing;

a marking element mounted to said housing adjacent to said flexible tape, generally perpendicular to said bottom wall, axially co-planar with said housing indicia and said incremental indicia when aligned, said marking element including:
- an elongate member with a point for forming a mark on a surface,
- an elongated holder surrounding and encasing said member,
- a button mounted in said housing which moves in a linear motion,
- a means of controllably coupling said linear motion of said button to said elongate member and said holder which moves said point between a retracted position, wherein said point is positioned above the outer surface of said bottom wall, and an extended position, wherein said point extends below said outer surface and onto said surface, and
- slidably across said surface independent of said housing such that an indicium is created on said surface.

30. The measuring and marking implement of claim 29, wherein said means of actuating creates a graduated braking force on said flexible tape when said point moves from said retracted position to said extended position.

31. The measuring and marking implement of claim 29, wherein said elongate member is graphite and a surrounding holder.

32. The measuring and marking implement of claim 29, wherein said housing contains a level.

33. The measuring and marking implement of claim 29, wherein said housing contains a lens which includes a graphic indication.

34. The measuring and marking implement of claim 29, wherein said housing contains a lens which includes a means of magnification for alignment and legibility of said incremental indicia.

35. The measuring and marking implement of claim 29, wherein said housing has a detachable attachment used with a separate marking element for scribing a perpendicular line from an edge, an angled line relative to an edge, and/or a parallel line to an edge.

36. The measuring and marking implement of claim 29, wherein said flexible tape incorporates a pivot around which an arc-shaped indicium is made when said marking point is in said extended position.

37. The measuring and marking implement of claim 29, wherein said marking element is located within said housing.

38. The measuring and marking implement of claim 29, wherein said marking element is accessed by means of a door in said housing.

39. The measuring and marking implement of claim 29, wherein said marking element is residually biased to said retracted position.

40. The measuring and marking implement of claim 29, wherein said housing includes a means for locking said flexible tape at a preselected position with respect to said housing.

41. The measuring and marking implement of claim 29, wherein said elongated member and said elongated holder are the same part.

42. A method of making a mark on a surface with a tape measure, the tape measure including a housing, the method comprising the steps of:
  (a) locating the housing at a location on the surface at which a mark is to be made; and
  (b) actuating a finger-actuated mechanism on the housing, said step (b) of actuating the finger-actuated mechanism performing the steps of:
    (i) moving an end of a marking mechanism in the tape measure into contact with the surface without moving the housing relative to the surface; and
    (ii) moving the end of the marking mechanism across the surface to make the mark without moving the housing relative to the surface.

* * * * *